S. D. BURBANK.
Eye-Glass.

No. 162,026.

Patented April 13, 1875.

Witnesses:
Geo. H. Graham.
W. E. Chaffee

Inventor
Samuel D. Burbank
By Daniel Breed atty

THE GRAPHIC CO. PHOTO-LITH. 39 & 41 PARK PLACE, N.Y.

UNITED STATES PATENT OFFICE.

SAMUEL D. BURBANK, OF SPRINGFIELD, MASSACHUSETTS.

IMPROVEMENT IN EYEGLASSES.

Specification forming part of Letters Patent No. 162,026, dated April 13, 1875; application filed April 9, 1875.

*To all whom it may concern:*

Be it known that I, SAMUEL D. BURBANK, of Springfield, in the county of Hampden and State of Massachusetts, have invented an Improvement in Eyeglasses, of which the following is a specification:

The object of my invention is to hinge the adjustable nose-piece of an eyeglass and limit the motion to the vibration in a single plane, as will be more fully explained hereafter.

Figure 1:
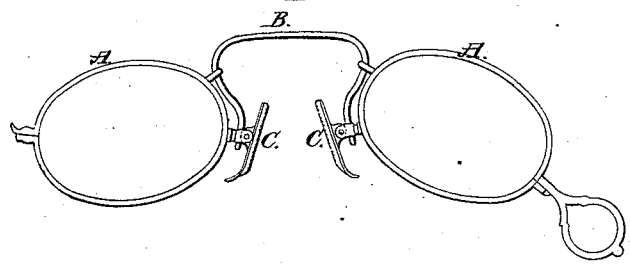
Figure 2:
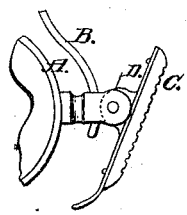
Figure 3:

In the accompanying drawings, Figure is a front view of an eyeglass with my improvement. Fig. 2 is a side view of the nose-piece detached. Fig. 3 is a face view of the same.

My invention or improvement in eyeglasses consists of a pivoted nose-piece, which vibrates in a single plane nearly corresponding with the general plane of the glasses.

In the manufacture of my improved eyeglasses the frame A and the spring B may be of any ordinary construction, and the nose-piece C may be attached either to the frame, the spring, or otherwise. The nose-piece C may be made of metal, and faced with rubber, gutta-percha, or other material, or made in one piece from any suitable material, or in any other proper manner. This piece is to be pivoted in the notch D; but the precise construction of this hinge is not important so long as the motion is substantially the same, and limited to the same general plane of the glasses.

This pivot-motion of the adjustable nose-piece C is different from that of a ball-and-socket or universal joint.

The pivot and other devices of this construction are cheaper than those of the universal joint. Also, my eyeglass is more readily adjusted upon the nose, and less liable to fall or get out of position, especially when the person is moving or riding.

This nose-piece may be riveted in place; but I do not like this construction, even when the nose-piece is riveted to the downward-projecting end of the spring, and thus deriving some adjustability. But I propose to use any suitable fastening so long as the nose-piece vibrates or moves only in a single plane, substantially as set forth.

Having described my invention, I claim—

The self-adjusting nose-piece C, pivoted at or near its center, or vibrating in a single plane, substantially in the manner and for the purposes set forth.

SAMUEL D. BURBANK.

Witnesses:
GIDEON WELLS,
IMOGEN A. COOPER.